UNITED STATES PATENT OFFICE.

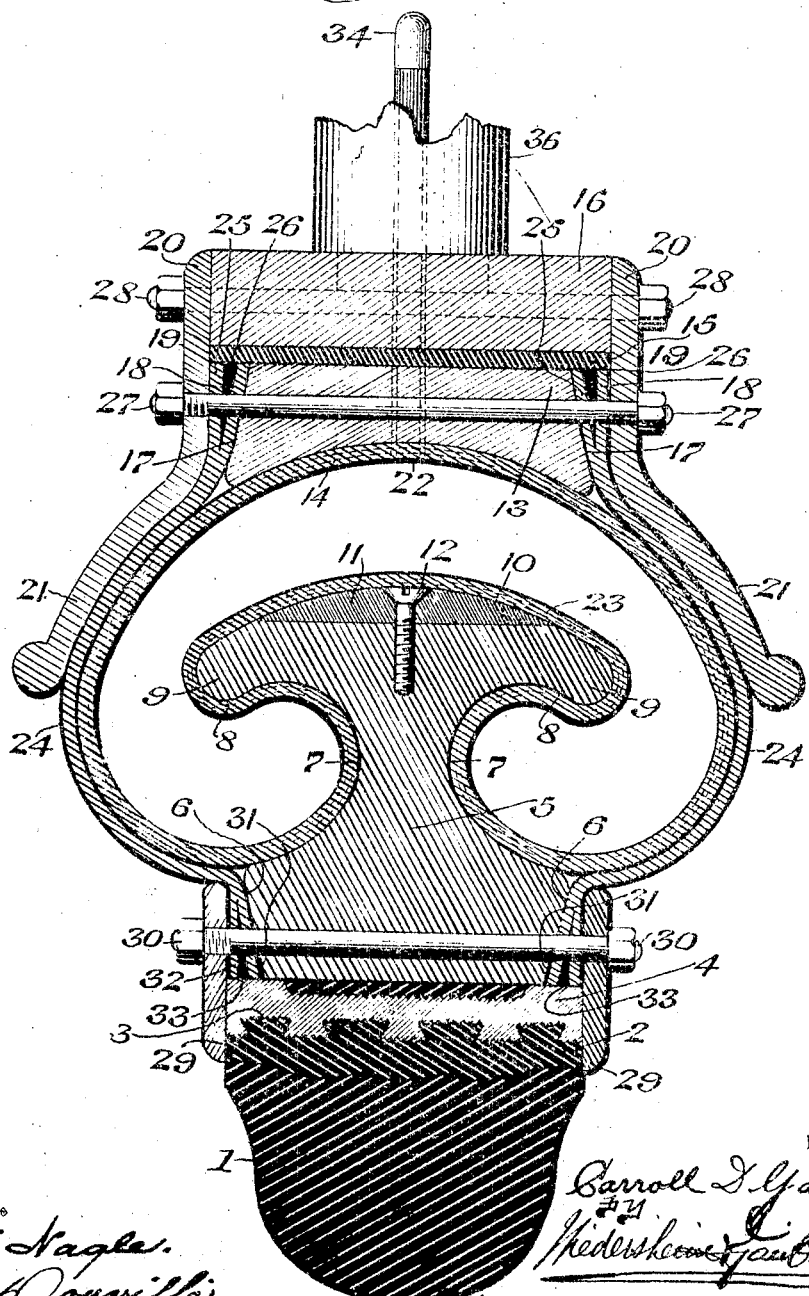

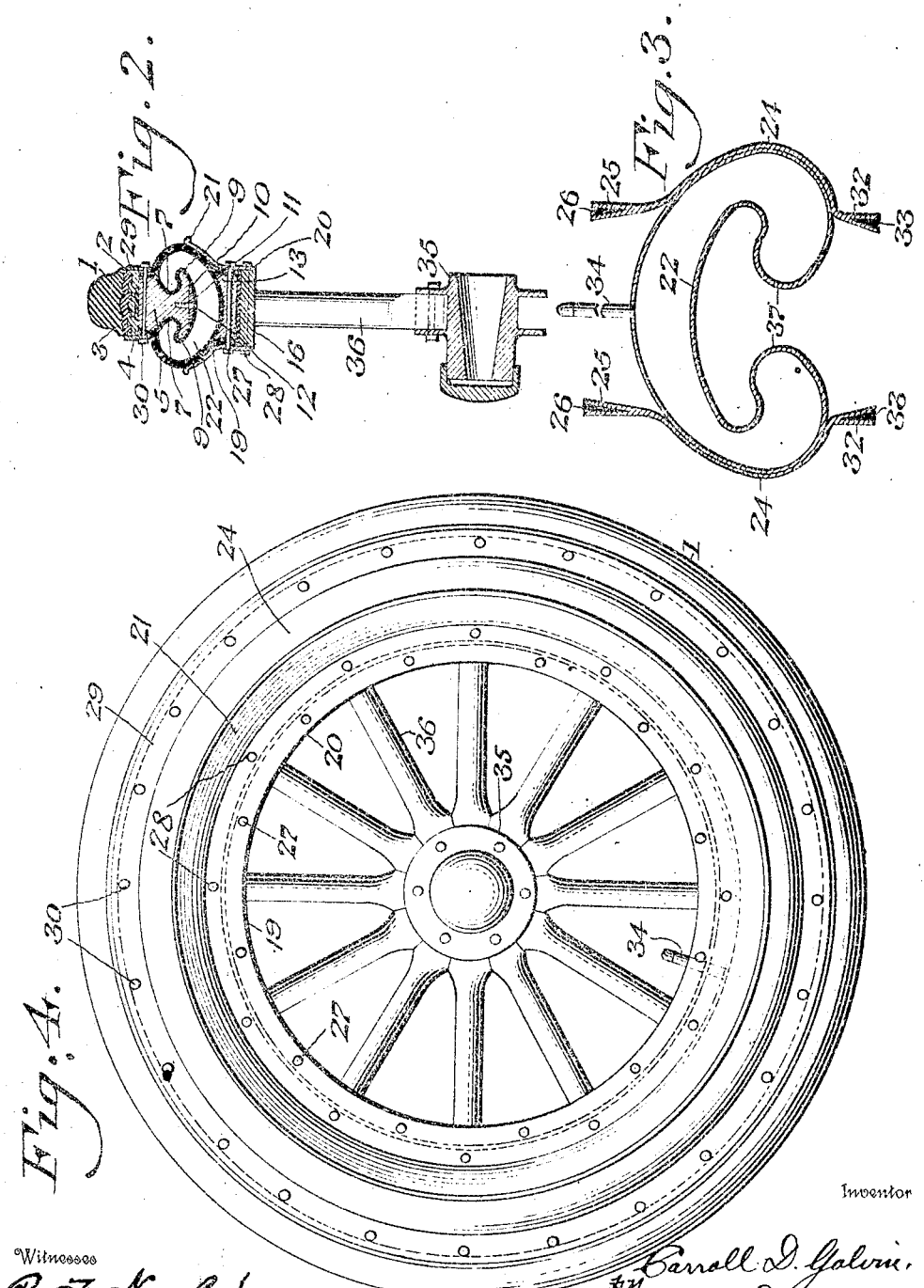

CARROLL D. GALVIN, OF MERCHANTVILLE, NEW JERSEY, ASSIGNOR OF ONE-SIXTH TO AMANDUS F. JORSS, ONE-SIXTH TO CHARLES JACOBSEN, AND ONE-SIXTH TO EUGENE S. COCHRAN, ALL OF WASHINGTON, DISTRICT OF COLUMBIA.

REMOVABLE RIM FOR VEHICLE-WHEELS.

1,020,140.  Specification of Letters Patent. Patented Mar. 12, 1912.

Application filed December 6, 1911. Serial No. 664,139.

*To all whom it may concern:*

Be it known that I, CARROLL D. GALVIN, a citizen of the United States, residing at Merchantville, county of Camden, State of New Jersey, have invented a new and useful Removable Rim for Vehicle-Wheels, of which the following is a specification.

My invention consists of a novel construction of removable rim carrying an outer tread which is adapted to be readily disengaged from or secured to the ordinary rim or felly of an automobile or other vehicle wheel, without necessitating the removal of the wheel, provision being made for suitably protecting the pneumatic tube employed from puncture, heat and the like, the wear being taken up, upon an outer preferably solid tread of suitable resilient or other material, means being provided for transference of motive power, lessening shocks in starting or stopping, reducing the oscillating effect of motion, when used for propelling purposes, reducing vibration caused by unevenness of roads, absorbing or diminishing shock caused by the tire running over rough or uneven surfaces, thereby increasing the durability of the vehicle and mechanism carried thereby, provision being further made for the cushioning of rebound shock and for greatly increased weight-carrying capacity.

To the above ends my invention consists in providing a novel construction of pneumatic tube having the inner portion composed of a preferably continuous tube of material of novel contour in cross section, said material having suitably vulcanized or otherwise secured thereto, an outer casing, having its inner and outer terminals suitably secured in fixed position within rigid incasing plates or walls, which are securely held in assembled position by transverse fastening devices.

It further consists of a novel combination of an outer preferably solid tread held in position with respect to the outer terminals of the pneumatic device, by common fastening means, in combination with an outer felly having annularly recessed sides overhung by a central member substantially T-shaped, in cross section, whereby I am enabled by the compression of a trough-shaped tube into said recesses to form a transverse leverage against the compressed air of the inflated side segments of the pneumatic tube to resist side thrust from all directions.

It further consists of a novel construction of a removable rim adapted to be readily fitted upon a wheel body or rim of the usual construction and to be held in position by outwardly flaring side flanges, which latter partially encompass the pneumatic tube, the outer terminals of the latter, being secured between the outer T-shaped felly and its restraining side flanges, which latter also serve to retain in assembled position the outer tread, which may be solid or hollow.

It further consists in providing the inner and outer terminals of the pneumatic tube at their exterior perimeters, with wedge-shaped noncompressible cores, which latter are received and interlocked in wedge-shaped pockets in both the removable rim and the exterior felly, whereby when the parts are assembled a positive drive is given through these members for the transmission of power to the outer tread.

It further consists in the combination of a removable rim having an exterior, concave surface juxtaposed to a similar concentric, curved portion of the outer felly, whereby in case of the deflation of the pneumatic tube from any cause, the outer felly forms a riding member for the removable rim, without necessitating stoppage or cessation of the rotary motion of the wheel and enabling the same to be used to its destination.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical sectional view, of my novel construction. Fig. 2 represents, on a reduced scale, a sectional view of a wheel, having my invention applied thereto. Fig. 3 represents, on a reduced scale, a cross section of my novel pneumatic tube in detached position, showing particularly the driving flanges thereof. Fig. 4 represents a side elevation of a vehicle wheel having my invention applied thereto.

Similar numerals of reference indicate corresponding parts in the figures.

Referring to the drawings, 1 designates an outer tread member the same being preferably solid and of rubber or other resilient material, which is vulcanized or otherwise secured upon a hard rubber base 2, my preferred construction being indicated in Fig. 1, wherein I have shown said hard rubber base 2 as dove-tailed into serrated apertures 3 in the wheel base or tire 4, which is cushioned by hard or vulcanized rubber, whereby a homogenous solid tire is produced, the above parts being of the usual construction.

5 designates my novel construction of outer felly or anchor rim, which may be made of wood, fibre, tubing or other material, whose exterior perimeter fits snugly upon the metal wheel base or tire 4, and is provided with the beveled or outwardly converging walls 6, which are abruptly recessed or annularly concaved on the opposite sides as indicated at 7, said walls being extended outwardly, as indicated at 8, and thence reversely curved, as indicated at 9, the inner annular portion of said outer felly 5, being provided with a gradually curved surface 10, which is, by preference formed by the insertion of a separate filler or stiffening member 11, whose contour will be understood from Fig. 1, said member being secured in position by suitable fastening devices 12.

13 designates a removable rim having the outer concave wall 14, which is curved on substantially the same radius as the curved surface 10 of the outer felly. 15 designates an inner metal tire suitably secured to the wheel felly, body or rim 16, which latter is standard or of usual construction. The removable rim 13 is provided on its opposite sides with the beveled or inwardly converging walls 17, whereby the wedge-shaped recesses 18 are formed between said walls 17 and the outer annular flanges of the retaining side plates 19, whose inner portions 20 are secured to the wheel rim 16, while their outer portions 21 are flared outwardly and project for a considerable distance beyond said removable rim 13. 22 designates the pneumatic tube, whose construction will be apparent from the enlarged view Fig. 1, said tube consisting of the inner portion 23, which is shaped so as to conform to the curved surfaces 7, 8, 9, 10 and 14 already described, so that when in- flated, the outer contour of said tube conforms to the contour of the inner walls of the flaring portions 21 of the side retaining plates 19.

In practice, I secure to the outer side portions of the pneumatic tube 22, by vulcanizing or otherwise, the annular members 24, whose inner terminals 25, are provided with the wedge-shaped cores 26 of suitable non-compressible material, thereby distending the inner terminals of said members 24, which latter are located and interlocked in the annular wedge-shaped pockets 18, so that when the transverse bolts 2 are tightened, the outer plates 19 are assembled in substantially the position seen in Fig. 1 with respect to the removable rim 13 and the inner terminals 26, will be firmly interlocked in the annular wedge-shaped pockets 18 against all displacement. 2 designates other transverse fastening devices, which extend through the portions 2 of the side plates 19, whereby the latter are tightly secured in engagement with the sides of the wheel rim or body 16.

29 designates a plurality of plates of metal or other suitable material, which are secured to the sides of the outer tread member 1 by means of transverse fastening devices 30, it being apparent that a wedge shaped pocket 31 is formed between the inner walls of said plates 29 and the juxtaposed beveled walls 6, of the outer felly 5 in which pockets are seated the outer terminals 32 of the annular members 24, said terminals being provided with annular wedge-shaped cores 33, whereby said outer terminals are given a wedge-shaped contour, so that the same can be readily interlocked in said wedge-shaped pockets 31 upon the tightening of the bolts 30, whereby power is transmitted directly from the rim to the outer tread member 1, through the medium of the outer casings 24, and tube 23, which is vulcanized or otherwise secured thereto.

34 designates an air tube communicating with the interior of the tube 22, whereby the latter can be inflated according to requirements.

In Fig. 2 I have shown the application of my invention to the ordinary wooden wheel now commonly employed on automobiles and similar vehicles, 35 designating the hub of said wheel and 36 the wooden spokes thereof. I desire to call special attention to the fact that my invention, in its broad aspect, comprises the removable rim 13, the side plates 19, the felly 5, the pneumatic tube 22 constructed as shown the outer tread 1 and the connecting devices common to said outer tread, the pneumatic tube and the felly 5, provision being thus made for enabling my invention to be readily and quickly applied to the wooden or other vehicle wheels of standard size now commonly employed by merely manipulating the bolts 28.

In my novel construction it is only necessary to inflate the inner pneumatic tube to about twenty pounds pressure which is a very great advantage over the present type of exterior pneumatic tubes, which ordinarily require an air pressure of from eighty to ninety pounds. It will further be apparent that in my novel construction the pneumatic tube is entirely removed from contact with the earth or the road whereby there is no liability whatever for the tube to become punctured or heated, the tube at the same time retaining its resilient function and having the added functions of increasing its load carrying capacity to a degree several times as great as when the pneumatic tube is exteriorly placed, it being evident that the weight is distributed over a rigid incasing arc of the outer felly 5 several times as great as the area of the supporting tread of the exterior pneumatic tire commonly used. A pneumatic tube situated and collocated with coacting elements which I have dedescribed by the employment of the concentric curvature of the removable rim and felly 5, results in the formation of a restraining wall which cushions all rebound of the down thrust of the load, and forms a circular internal shock absorbing cushion within the wheel, where all shocks from every direction are cushioned at substantially right angles to any point of occurrence by the opposite segment of the tube and the restraining wall of the rim.

The pneumatic tube 22 may be formed of layers of fabric and rubber and the outer portions 24 having the terminals 32 and 25 may be constructed of sheet rubber and fabric vulcanized or otherwise secured together thereby forming flexible outer reinforcing walls for the inner tube 22, said inner and outer terminals 25 and 32, when assembled in the position seen in Fig. 1, in their wedge-shaped pockets and compressed by their respective draw-bolts, form not only a casing for the inner tube but in addition serve the function of driving belts for the transmission of motive power to the outer perimeter or tread 1 of the wheel. By my novel construction of pneumatic tube 22, which as seen in Fig. 3 is preferably of substantially U or horse-shoe shape having its curved portions 37 deflected toward each other, it will be seen that the same coacts with the overhanging flanges 9 of the rim, the felly 5 thereby cushioning and resisting all side thrust and any deflation from the normal contour of the inflated tube, while in the case of deflation of the inner tube 22, by reason of the concentric juxtaposed curvatures at the points 10 and 14, the oppositely located curved portions 10 and 14 can ride upon each other without detriment to the wheel.

It will be apparent that by my novel construction and location of the pneumatic tube 22 and its adjuncts, noise caused by the contact of the tire with the road will be absorbed and, in addition, vibration and shock will be reduced to a minimum thereby giving ease and comfort to the occupants of the vehicle and in addition increasing its durability.

Having thus described my invention, what I claim as new and desire to secure by Letters Patent, is:—

1. A wheel rim comprising inner and outer annular members spaced apart, the outer member having annular recesses in its sides at intermediate points, cushioning means arranged in the annular space between said members and having portions directed toward each other and snugly occupying the recesses in the outer member, and annular protectors arranged at opposite sides of the cushioning means and extending between and connected with the inner member and the outer member.

2. A wheel rim comprising inner and outer annular members spaced apart, the outer member having annular recesses in its sides at intermediate points, cushioning means arranged in the annular space between said members and having portions directed toward each other and snugly occupying the recesses in the outer member, and annular protectors arranged at opposite sides of the cushioning means and extending between and connected with the inner member and the outer member, in combination with side plates attached to said inner member and overhanging said cushioning means.

3. A wheel rim comprising an inner felly portion, an outer felly spaced from said inner felly portion, cushioning means interposed between said inner felly portion and said outer felly and having inflated portions extending on each side of the latter, flexible driving disks having terminals anchored to the inner felly portion and the outer felly, and disks secured at opposite sides of the inner felly and overhanging the cushioning means and extending beyond the inner circumferential plane of the outer felly.

4. A wheel rim, comprising an inner felly portion, an outer felly spaced from said inner felly portion and having outer and inner portions and an intermediate portion of decreased thickness, whereby recesses are afforded between said outer and inner portions, cushioning means interposed between the inner felly portion and said outer felly and having inflated portions directed toward each other and disposed in said recesses of the outer felly and driving disks anchored to the outer and inner felly.

5. A wheel rim, comprising an inner felly portion, an outer felly spaced from said inner felly portion and having outer and inner portions and an intermediate portion of decreased thickness, whereby recesses are afforded between said outer and inner portions, cushioning means interposed between the inner felly portion and said outer felly and having portions directed toward each other and disposed in said recesses of the outer felly, driving disks anchored to the outer and inner felly, and disks secured to opposite sides of the inner felly and overhanging the cushioning means.

6. A wheel rim comprising an inner felly portion, an outer felly spaced from said inner felly portion and having outer and inner portions and intermediate portion of decreased thickness, whereby recesses are afforded between said outer and inner portions, the inner portion of said outer felly being provided with a surface concentric to the outer face of the inner felly and the walls of said recesses being curved and merged into said concentric surface, and cushioning means interposed between the inner felly portion and said outer felly and having portions directed toward each other and snugly occupying said recesses of the outer felly.

7. A wheel rim comprising an inner felly portion, an outer felly spaced from the inner felly portion and having outer and inner portions and an intermediate portion of decreased thickness, whereby recesses are afforded between said outer and inner portions, the surface of said inner portion being concentric to the outer surface of the inner felly portion, and the walls of said recesses being curved and merged into said concentric surface, and a pneumatic tube having an inflated portion interposed between the concentric surfaces of the inner felly portion and the outer felly and also having inflated portions directed toward each other and disposed in and snugly occupying the said recesses of the outer felly.

8. A wheel rim comprising an inner felly portion having a concaved periphery, an outer felly spaced from the inner felly portion and having outer and inner portions and an intermediate portion of decreased thickness, whereby recesses are afforded between said outer and inner portions, the surface of said inner portion being convex, and the walls of said recesses being curved and merged into said convex surface, a pneumatic tube having an inflated portion interposed between the concave inner felly portion and the inner convex portion of the outer felly and also having inflated portions directed toward each other and disposed in and snugly occupying the said recesses of the outer felly, annular side members secured to opposite sides of the pneumatic tube and having inner, wedge-shaped terminals anchored in the inner felly portion and also having outer wedge-shaped terminals disposed at opposite sides of the outer portion of the outer felly, disks arranged at the outer sides of said inner terminals, and overhanging the pneumatic tube, transverse bolts extending through and connecting the inner felly portion, disks and said inner terminals, plates arranged at the outer sides of said outer terminals, and transverse bolts connecting said plates, outer terminals and the outer portion of the felly.

CARROLL D. GALVIN.

Witnesses:
E. HAYWARD FAIRBANKS,
C. D. McVAY.